Figure 4:
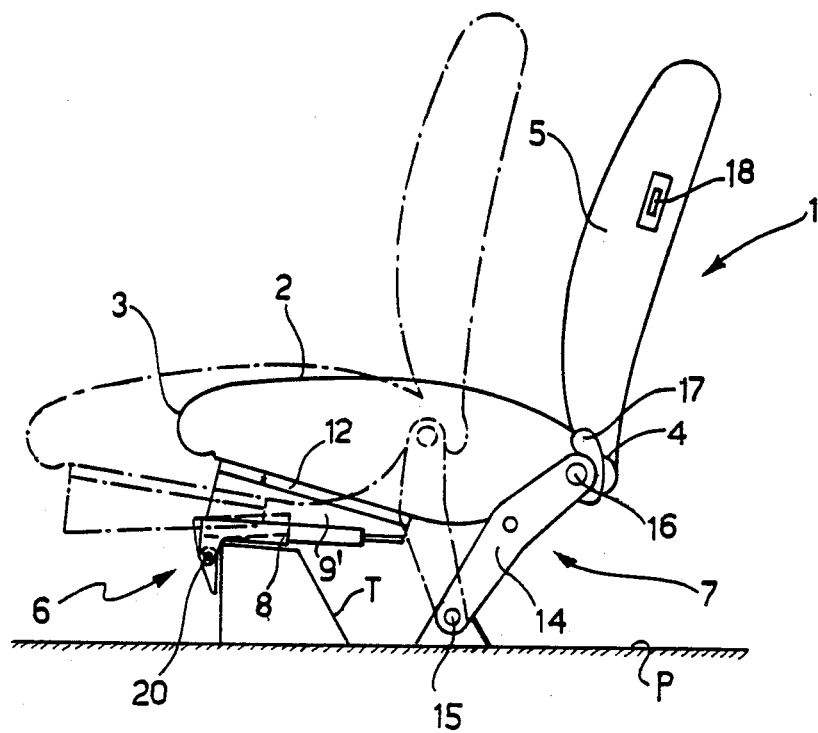

United States Patent [19]

Acuto et al.

[11] Patent Number: 4,846,520
[45] Date of Patent: Jul. 11, 1989

[54] FRONT SEAT ASSEMBLY FOR MOTOR VEHICLES, PARTICULARLY MOTOR CARS

[75] Inventors: Giovanni Acuto, Orbassano; Attilio DeMaria, Turin, both of Italy

[73] Assignee: Fiat Auto S.p.A., Italy

[21] Appl. No.: 172,886

[22] Filed: Mar. 25, 1988

[30] Foreign Application Priority Data

Mar. 25, 1987 [IT] Italy ............................... 67229 A/87

[51] Int. Cl.<sup>4</sup> ............................................. B60N 1/02
[52] U.S. Cl. .................................. 296/65.1; 297/341; 297/378; 297/383
[58] Field of Search ................. 296/65 R; 297/1, 311, 297/313, 316, 317, 322, 340, 341, 342, 378, 383

[56] References Cited

U.S. PATENT DOCUMENTS

| 3,189,312 | 6/1965 | Bilancia | 296/65 R |
| 4,368,916 | 1/1983 | Blasin | 296/65 R |

FOREIGN PATENT DOCUMENTS 1405918  1/1969  Fed. Rep. of Germany .... 296/65 R

Primary Examiner—Joseph F. Peters, Jr.
Assistant Examiner—Jesûs D. Sotelo
Attorney, Agent, or Firm—Sughrue, Mion, Zinn, Macpeak & Seas

[57] ABSTRACT

A front seat assembly for motor vehicles is supported at the front by a first support which includes two lower guides in which support members are mounted for longitudinal movement. The latter are, in turn, engaged at their upper ends for movement relative to upper guides fixed to the front part of the seat cushion. The support members can be locked in the lower guides in a rearwardmost position while the position with respect to the upper guides can be chosen from a plurality of fixed adjustment positions. The rear part of the seat is supported by two pivotable arms which, when the seat is moved towards a forwardmost position, cause the cushion to be raised gradually, so that the visual point is substantially maintained. To facilitate access to the rear seats, the backrest can be tipped forwards by disengagement of a retaining member which hold the backrest in a fixed position relative to the cushion and of the retaining member which hold the support members within the lower guide. As well as tipping the backrest forward, the whole set is thus displaced forwardly.

6 Claims, 2 Drawing Sheets

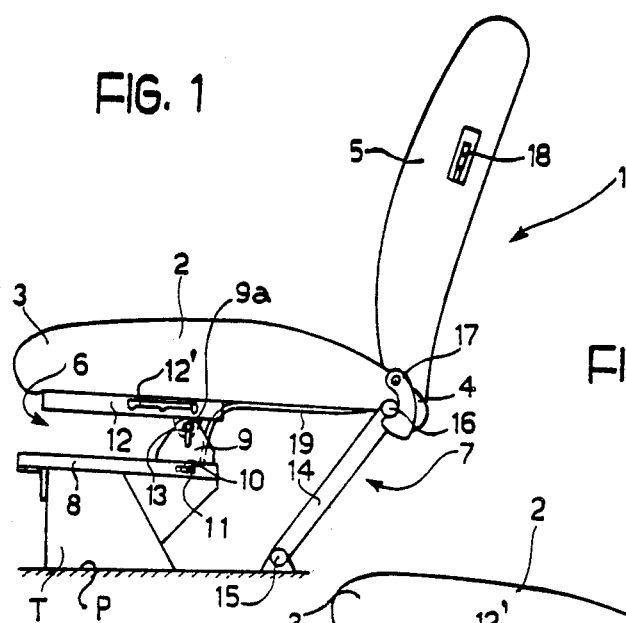
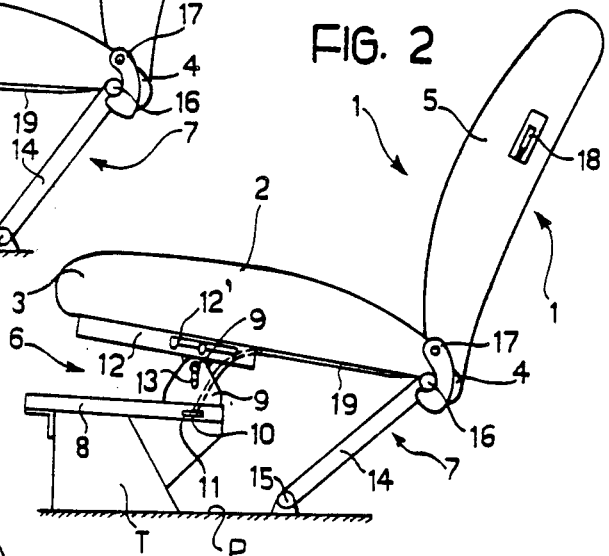
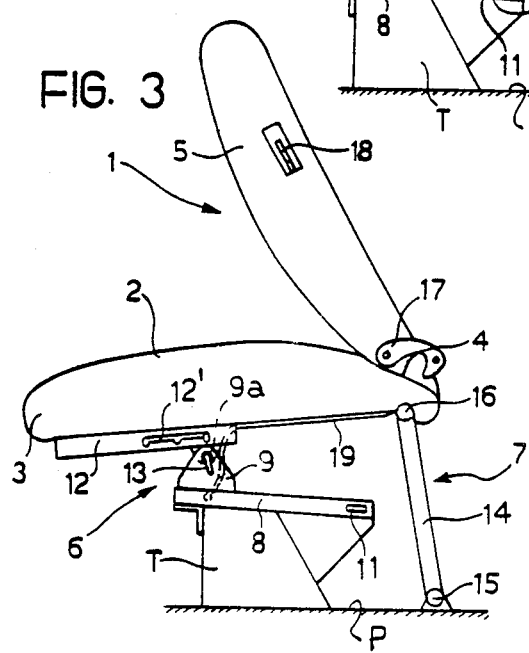

U.S. Patent   Jul. 11, 1989   Sheet 2 of 2   4,846,520

FRONT SEAT ASSEMBLY FOR MOTOR VEHICLES, PARTICULARLY MOTOR CARS

The present invention relates to front seats for vehicles and in particular, to a front-seat assembly for motor vehicles including a cushion which has a front part and a rear part, a backrest projecting upwardly from the rear part of the cushion, and first and second support members on the floor of the passenger compartment of the motor vehicle for supporting the front and rear parts of the cushion respectively.

Seat assemblies of the type specified above are in current use in the automotive sector.

The object of the present invention is to provide a front-seat assembly for motor vehicles which makes the best use of the space available under the seat cushion and, in the case of motor vehicles with two or three doors, facilitates access to the rear seats whilst permitting the longitudinal position of the seat to be adjusted precisely to achieve optimum adaptation to the anthropomorphic characteristics and preferences of the driver or passengers; the whole using a simple overall structure in order to limit production costs.

According to the present invention, this object is achieved by means of a seat assembly of the type specified above, characterised in that the first support means comprise:

at least one substantially-straight lower guide for fixing to the floor of the passenger compartment in a generally fore and aft direction in relation to the compartment itself; a support member with an upper end being engaged with the at least one guide for relative longitudinal movement, at least one upper guide, fixed to the front part of the cushion in a position generally above the lower guide and connected to the upper end of the support member for relative longitudinal movement, and first and second retaining means which can act between the support member and a respective one of the lower and upper guides to retain the support member in a position in which the seat is in its rearwardmost position with respect to one of the guides and in any one of a plurality of selected positions with respect to the other guide, and in that the second support means comprise at least one pivotable arm having a lower end which can be hinged to the floor of the passenger compartment and an upper end hinged to the rear part of the cushion of the motor vehicle.

The invention will now be described, purely by way of non-limiting example, with reference to the appended drawings, in which:

FIGS. 1 to 3 show the seat assembly according to the invention in three possible positions of use, and FIG. 4 illustrates a possible variant of the seat assembly according to the invention.

As a general indication, it should be mentioned that the expressions "front", "rear", "forwards", "backwards", "lower" and "upper", "rearward", as used in the present description and in the claims which follow, refer to the normal position of mounting of the seat assembly according to the invention in a motor vehicle, such as a motor car, and to the normal direction of travel of the motor vehicle itself.

In the drawings, a front seat assembly for motor vehicles, generally indicated 1, can be seen to include:

a seat member 2, referred to briefly as the "cushion:, including a front part 3 and a rear part 4, a backrest 5 which extends upwardly from the rear part 4 of the cushion 2, and a support assembly for enabling the seat to be mounted on the floor P of the passenger compartment of the motor vehicle (not illustrated as a whole).

It can be seen that the latter includes first and second support members, indicated 6 and 7 respectively, for supporting the cushion 2 (and the seat as a whole) in correspondence with the front part 3 and the rear part 4 of the cushion 2 itself.

The support members or means 6 and 7, which will be further described below, consist in general of pairs of homologous members arranged substantially symmetrically on the two sides of the seat.

Naturally, further embodiments can be envisaged, and fall within the scope of the present invention, which provide single means of support 6 and 7 located in a central position in relation to the seat in order to put the invention into effect.

However, the description below will refer to the use of pairs of similar members, only one member of each pair, shown in the drawings, being described, that is to say, the one mounted on the left side of the seat (still with reference to the normal direction of travel of the vehicle), it being understood that the other member of each pair is substantially identical or symmetrical.

In the embodiment illustrated, the seat assembly 1 is designed to be mounted on the floor P astride a transverse stiffening member (cross member) T of the floor P itself.

The front support means 6 comprise (on each side of the seat):

a straight lower guide 8 fixed to the floor P (in this particular case, to the upper part of the cross-member T) so that it extends in a generally fore and aft direction with respect to the passenger compartment, a support member 9 engaged within or mounted astride the guide 8 which can move longitudinally relative to the guide 8 itself; more precisely, the member 9 can move along the guide 8 between a position illustrated in FIGS. 1 and 2, in which it is as far back as possible (rearwardmost position) and a position illustrated in FIG. 3 in which it is tipped or located as far forward as possible, a locking mevchanism (first retaining means), of any known type, consisting, for example, of a pin 10 which can extend from the member 9 to engage a corresponding formation, such as a hole 11, provided at the rear end of the guide 8, to hold the member 9 firmly in the rearwardmost position of FIGS. 1 and 2.

an upper guide 12, also substantially straight, mounted in a fore and aft direction on the underside of the front part 3 of the cushion 2 in a position generally above the lower guide 8; the guide 12 is connected to the upper end 9a of the support member 9 for relative longitudinal movement, and further retaining means (here illustrated schematically in the form of a bolt mechanism controlled according to a method currently used in the automotive field for the adjustment of seats, by means of a lever 13 accessible on one side of the seat) which allow the position of the upper guide 12 relative to the support member 9 to be adjusted to any one of a plurality of relative positions identified, for example, by notches 12' provided in the upper guide 12 and engageable by the bolt controlled by means of the lever 13.

The rear support means 7 comprise essentially, once again on each side of the seat, a pivotable arm 14 having a lower end 15 hinged to the floor P of the passenger compartment, and an upper end 16 hinged to the rear part 4 of the cushion 2. The hinged connection of the arm 14 to the floor and to the cushion of the seat can be achieved in any known way which permits the arm 14 to pivot in a vertical plane substantially in line with the longitudinal direction of movement of the vehicle.

For reasons which will become clearer below, the position at which the lower end 15 of the arm 14 is hinged is chosen so that it is in front of, that is forward of, (still with reference to the normal direction of movement of the motor vehicle) the position at which the upper end 16 is hinged to the cushion 2.

The back rest 5 is mounted on the cushion 2 in such a way that the two parts form a unit which can be displaced longitudinally of the passenger compartment to allow the position of the seat to be adjusted precisely according to the anthropomorphic characteristics and preferences of the driver or of the passenger. Hinge means of any known type (not illustrated in detail as they are not relevant to the understanding of the invention) are interposed between the backrest 5 and the cushion 2 to allow the inclination of the backrest 5 relative to the cushion 2 to be adjusted selectively. The backrest 5 is held in the chosen position of adjustment (inclination) relative to the cushion 2 by further retaining means, schematically shown in the form of a hook member 17 which can be operated by means of a lever 18 projecting from one side of the backrest 5. The lever 18 enables the backrest 5 to be unlocked from the cushion 2 so that, as better seen below, it can be completely tipped forward relative to the cushion 2.

The lever 18, which controls the retaining means 17, is also connected, for example by a flexible-cable control 19, to the retaining means 10, 11 which lock the support member 9 in its rearwardmost position on the lower guide 8.

In normal use, that is, when the vehicle is in motion, the support member 9 (or, more precisely, each of the support members 9 provided on the sides of the seat) is kept in the rearwardmost position of the seat on the lower guide 8, with the respective retaining means 10 and 11 in the locked position. In these conditions, the support member 9 is fixed relative to the floor P of the passenger compartment. The longitudinal position of the cushion 2 and of the seat as a whole can then be adjusted as required by varying the position of the upper guide 12 with respect to the upper end of the support member 9.

For example, it can be moved from a "forward" position, such as that illustrated in FIG. 1 (suitable for small drivers or passengers) to a "backward" position, as illustrated in FIG. 2 (suitable for taller drivers or passengers). For this purpose, the passenger or driver needs only to move the lever 13 so as to disengage the bolt from the notches 12' in the guide 12, enabling the seat to be moved to the required position, in which it can be locked by release of the control lever 13.

During the longitudinal adjustment of the seat, whilst the front part 3 of the cushion remains at an approximately constant height, the height of the rear part varies considerably due to the position of mounting of the arm 14, whose lower end 15, as can be seen, is further forward than its upper end 16.

In particular, when the cushion 2 is moved forwards, its rear part 4 is raised in relation to the floor P. On the other hand, when the cushion 2 is moved backwards, the rear part 4 of the cusion 2 is gradually lowered.

Thus a rotational movement of the cushion 2 is superposed on the longitudinal translational movement. The combination of these two movements causes raising or lowering of the so-called H point of the seat, according to whether the seat itself is moved forwards or backwards.

This variation in the height of the H point enables the visual point of the driver of passenger to be maintained at an approximately constant height irrespective of stature. In fact, small drivers and passengers bring the seat forward, with a consequent raising of the H point indicated above. On the other hand, taller drivers and passengers who adjust the seat backwards, will sit on a cushion 2 whose H point is correspondingly lower.

In a preferred embodiment for motor cars with two or three doors, the seat can be tipped forwards to facilitate access to the rear seats of the motor vehicle.

This is achieved by means of the lever 18 which causes the simultaneous disengagement of the retaining means 10 and 11 which hold the support member in the rearwardmost position relative to the guide 8, and of the retaining means 17 which hold the backrest in a fixed position relative to the cushion 2.

The disengagement of the retaining means enables the member 9 to move forwards on the guide 8, whilst the backrest 5 can be folded forwards onto the cushion 2. The overall result obtainable by these means is shown diagrammatically in FIG. 3. It can be seen that the operation of the lever 18, and the consequent tipping or folding forwardly of the seat, in no way affects the position of adjustment of the seat, that is the relative position adopted by the support member 9 with respect to the upper guide 12. In the embodiment illustrated in FIG. 3, this position of adjustment corresponds to the forwardmost position illustrated in FIG. 1.

In the embodiment illustrated in FIG. 4, (in which, for simplicity, the various retaining and locking parts are omitted) between the lower guide 8 and the upper guide 12 is a support member 9' which is generally wedge-shaped and has two sides, an upper one (9a) and a lower one respectively, and which is connected to the guides 8 and 12 for relative longitudinal movement. The two sides of the support member 9' diverge from each other towards the front part 3 of the cushion 2 so that, as the upper side 9a of the support member 9' moves along the upper guide 12 during longitudinal adjustment, the height of the cushion is also varied. The lower guides 8 are mounted on the cross-member T by means of hinges 20 with horizontal axes to allow the cushion 2 to pivot, particularly during forward tipping (schematically illustrated in chain line).

As well as the structural parts described here, the seat assembly 1 could, naturally, according to known designs, include springs - and possibly - servo-motors to facilitate the adjustment and tipping of the seat by the occupant.

Naturally, the principle of the invention remaining the same, the details of realisation and forms of embodiment can be widely varied with respect to those described and illustrated, without thereby departing from the scope of the present invention. In particular, as explicitly provided for by the claims, the roles of the guides 8 and 12 can be reversed with respect to those illustrated, the guides 8 being used to regulate the position of the seat and the guides 12 to tip it forwards.

We claim:

1. A front seat assembly for motor vehicles, including a cushion which has a front part and a rear part, a backrest projecting upwardly from the rear part of the cushion and first and second support means on the floor of the passenger compartment of the motor vehicle for supporting the front part and the rear part of the cushion respectively, said first support means comprising:
- at least one substantially straight lower guide for fixing to the floor of the passenger compartment in a generally fore and aft direction in relation to the passenger compartment itself; a support member being engaged with the at least one lower guide for relative longitudinal movement;
- said support member having an upper end;
- at least one upper guide fixed to the front part of the cushion in a position generally above the lower guide and connected to the upper end of the support member for relative longitudinal movement, and
- first and second retaining means which can act between the support member and a respective one of the lower and upper guides to retain the support member in a position in which the seat is in its rearwardmost position with respect to one of the guides and in any one of a plurality of selected positions with respect to the other guide,
- and in that the second support means comprise at least one pivotable arm having a lower end which can be hinged to the floor of the passenger compartment and an upper end hinged to the rear part of the cushion.

2. A seat assembly according to claim 1, wherein the first retaining means can hold the support member in a rearwardmost position on the lower guide, whilst the second retaining means can hold the upper guide and the support member (9) in any one of a plurality of selected relative positions.

3. A seat assembly according to claim 1 wherein said at least one lower guide has associated means of hinge-type for fixing it to the floor of the passenger compartment about a substantially-horizontal hinge axis.

4. A seat assembly according to claim 1 wherein the lower end of the pivotable arm can be fixed to the floor of the passenger compartment in a position generally forward of the upper end of the arm so that forward pivoting of the arm causes the rear part of the cushion to be raised.

5. A seat assembly according to claim 1 comprises a pair of lower guides including said at least one lower guide, a pair of upper guides including said at least one upper guide and a pair of pivotable arms including said at least one pivotable arm, each pair being arranged symmetrically on opposite sides of the assembly.

6. A seat assembly according to claim 1 wherein the backrest can be pivoted relative to the cushion and third retaining means are provided for holding the backrest in a fixed position relative to the cushion, the first and third retaining means being interconnected mechanically so that the first and third retaining means can be disengaged simultaneously, thus permitting the support member to move longitudinally relative to one of the guides away from the rearwardmost position of the seat and enabling the backrest to be pivoted forwardly relative to the cushion.

* * * * *